March 29, 1927.
G. W. HALL
1,622,908
DEVICE FOR MEASURING LENGTHS OF PIPES
Filed April 28, 1926  4 Sheets-Sheet 1
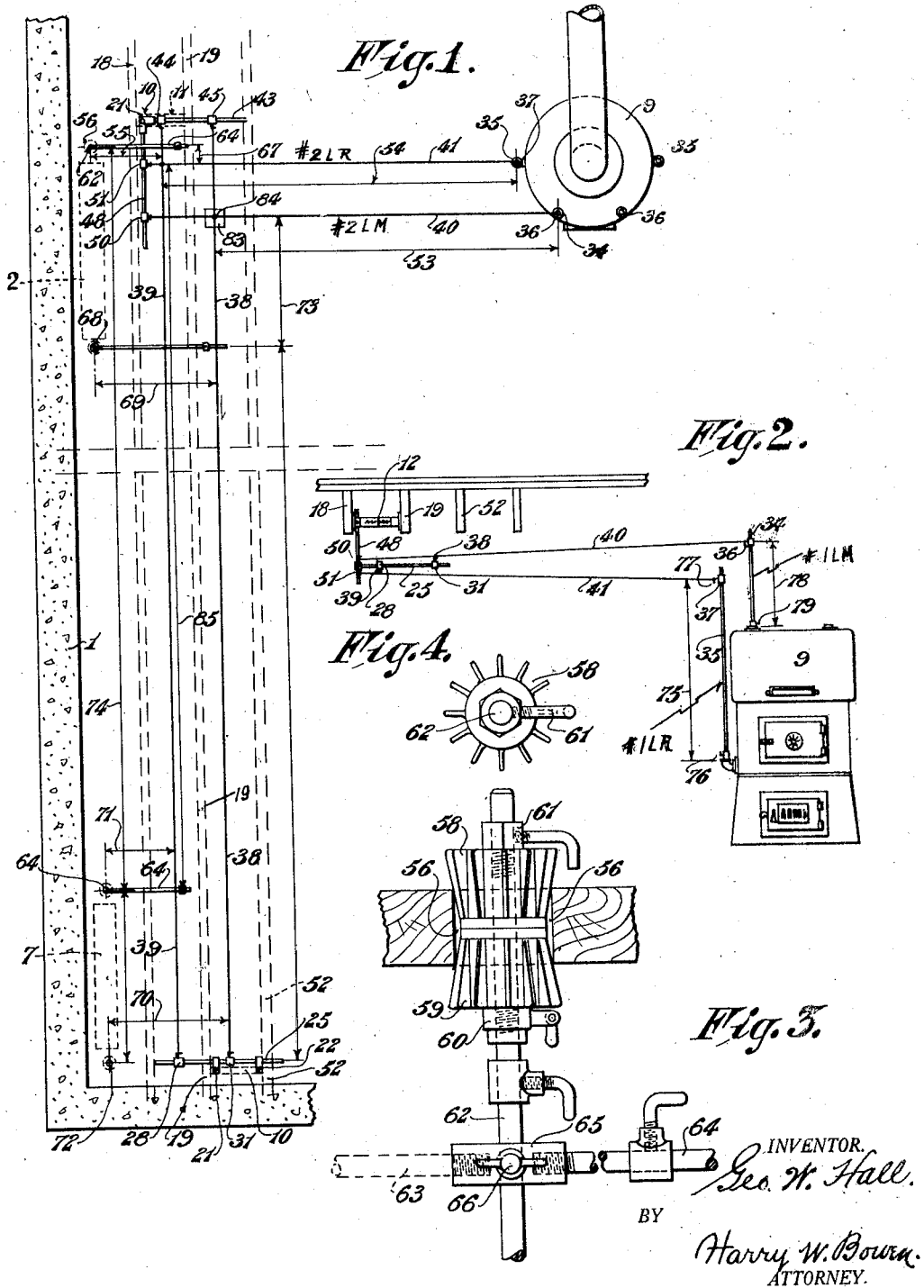

March 29, 1927.
G. W. HALL
1,622,908
DEVICE FOR MEASURING LENGTHS OF PIPES
Filed April 28, 1926    4 Sheets-Sheet 2
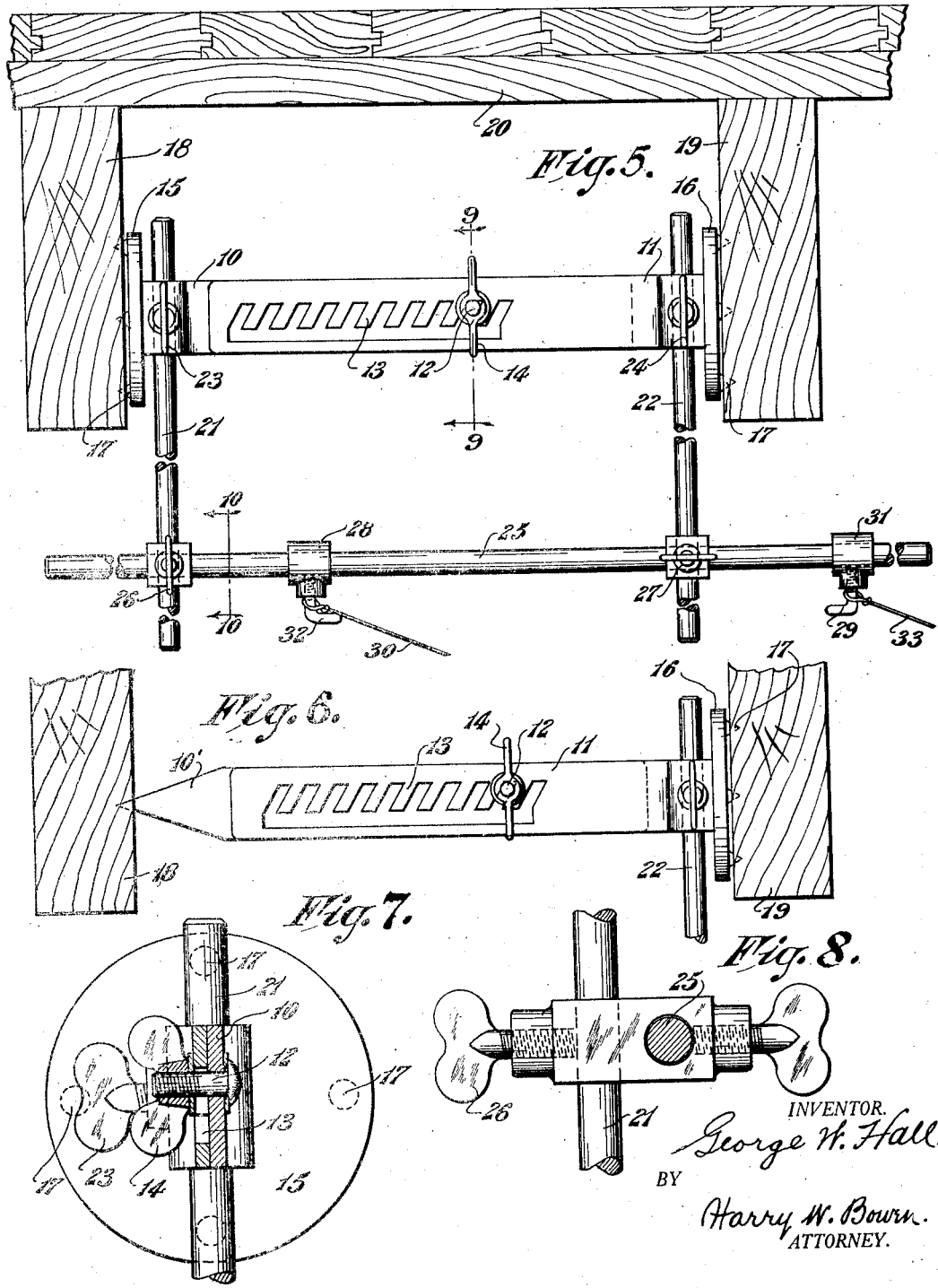

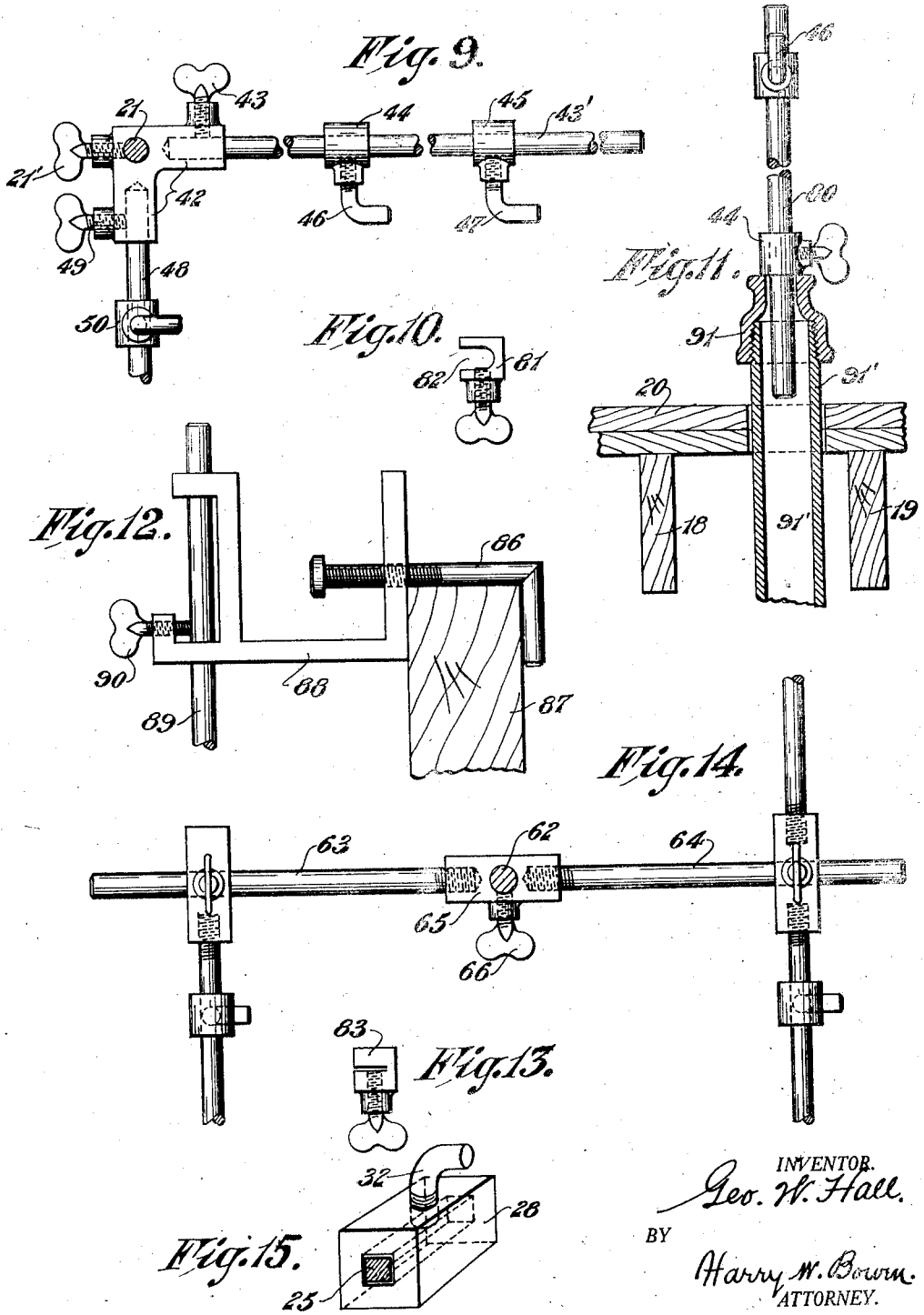

March 29, 1927.
G. W. HALL
1,622,908
DEVICE FOR MEASURING LENGTHS OF PIPES
Filed April 28, 1926     4 Sheets-Sheet 4
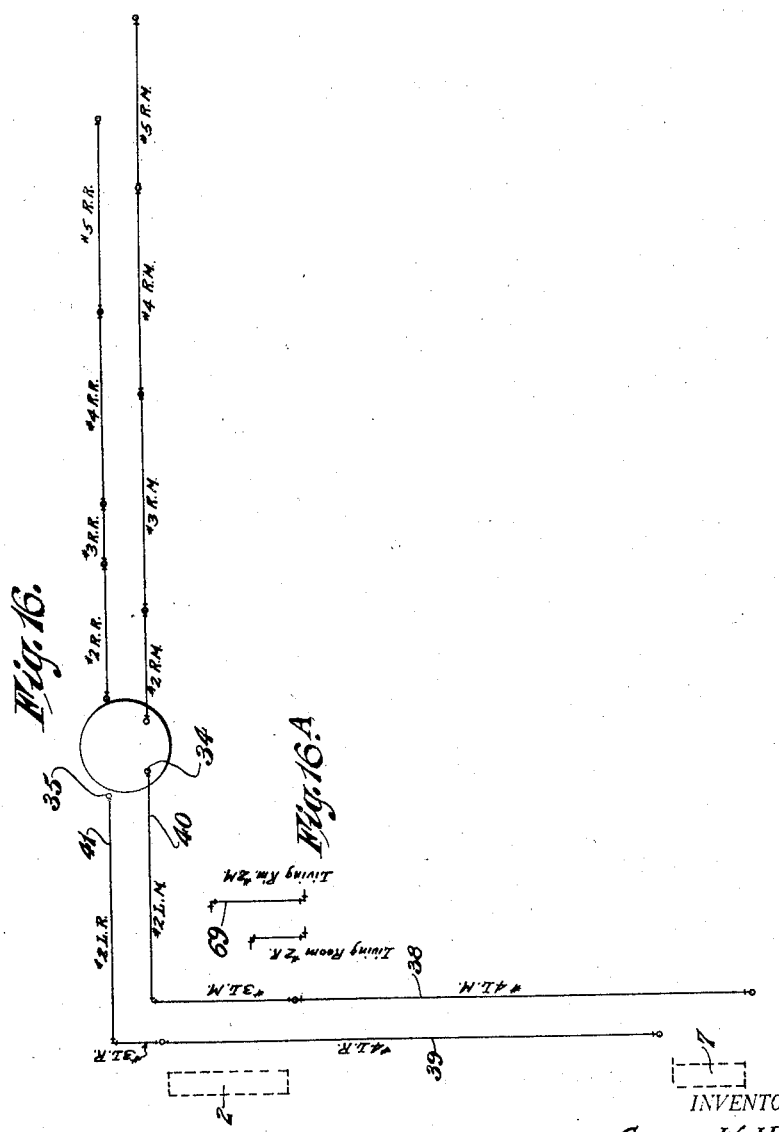
INVENTOR,
George W. Hall,
BY
Harry W. Bown.
ATTORNEY.

Patented Mar. 29, 1927.

1,622,908

UNITED STATES PATENT OFFICE.

GEORGE W. HALL, OF HARTFORD, CONNECTICUT.

DEVICE FOR MEASURING LENGTHS OF PIPES.

Application filed April 28, 1926. Serial No. 105,149.

This invention relates to improvements in devices for measuring lengths of pipes.

An object of the present invention is to accurately determine the lengths of the different pieces of pipes that are used by steam fitters in piping a building when steam or hot water is used for heating purposes.

The present practice usually followed is to make a measurement for a single piece of pipe, then cut it off to that measurement, next thread the ends and fit it in place. This operation is not only slow but often times it is inaccurate, especially when unskilled labor is employed.

An object of my improvement is to provide a device, or devices whereby accurate measurements of distances of center lines and points of the piping system may be made for the entire piece of work at one time, then, from these measurements cut all of the different lengths of pieces of pipes at one operation. The threads may next be formed on all of the pieces at one operation, then fit the different lengths of pipes all in place in the building.

This improvement therefore does away with the necessity of the separate operations of first measuring, then cutting, then fitting each piece in place. It is therefore designed to first make all of the measurements, then all of the cutting and threading, and finally fitting all of the pieces in place.

In general, it comprises devices that may be readily attached to or between the stringers, or joists, of the flooring of a building where the centers of the pipe lines are to be located and with slidable blocks thereon which may be placed and clamped to correspond with the center lines of the pipes when arranged horizontally. It also comprises devices for accurately locating the center lines of vertically arranged pipes which are to pass through openings in a floor.

These and other objects will appear in the body of the specification and will be pointed out specifically in the claims.

Referring to the drawings:

Fig. 1 is a plan view of a portion of the piping and illustrating the method of making measurements at a corner.

Fig. 2 is a detail view of the riser and return pipes from a boiler in combination with my device which is attached to the floor joists or beams which are shown in full lines.

Fig. 3 is a detail side view of that part of my device which is used in an opening of a floor for locating the vertical centers.

Fig. 4 is a plan view of Fig. 3.

Fig. 5 is an enlarged side elevational view of the device shown attached to and between two of the joists or floor stringers.

Fig. 6 is a side view of Fig. 5 showing a slight change.

Fig. 7 is a detail view of the clamp for the structure shown in Fig. 5 on the line 9—9.

Fig. 8 is a detail view on the section line 10—10 of Fig. 5.

Fig. 9 is a detail plan view of one of the corner pieces showing the slidable block members on the rods which are attached to the two arms of the corner pieces.

Fig. 10 is a detail view of one of the tape clamping members.

Fig. 11 is a detail view of that part of the device for locating the center lines of vertically disposed pipe lines which extend through the floor, or, within a partition.

Fig. 12 is a modification of the bracket member for clamping to a floor joist or stringer, or other part of the building.

Fig. 13 is a detail view of the clamping device for securing steel tapes together.

Fig. 14 is for extension members for the construction shown in Fig. 3, and

Fig. 15 is a detail view of one of the clamping rectangular shaped blocks.

Fig. 16 is a view of the general plan of piping.

Fig. 16^A is a detail of one of the short pipe connections.

Referring to the drawings in detail:

1 designates the outer wall or frame work of a building, illustrating a portion of the foundation wall. 2 and 7 designate two of the radiators in dotted lines that are to be piped. 9 the heater, either steam or hot water. 10 and 11 (see Fig. 5) designate two members that are designed to be adjusted longitudinally or relative to each other for fitting between the stringers, as shown. The member 10 is formed with an opening to receive the clamping bolt 12 and the other member 11 with notches 13 also to receive the clamping bolt. 14 is a thumb nut on the bolt 12 for clamping the members 10 and 11 together after adjustment, a detail of which is shown in Fig. 7. The members 10 and 11, in Fig. 5 are each formed with sharp projections 17 for entering the wood of the floor stringers or joists 18 and 19, the floor being indicated by the numeral 20. In Fig. 6 the member 10' is sharpened as shown and the member 11 is of the same construction. In practice the members 10 and 11 are tipped at an angle to each other, like a toggle joint, and then brought down into alignment with each other, as shown, whereby the sharp points 17 will enter the wood. This clamping device is also shown in Figs. 1 and 2 on a smaller scale. Slidably located in the members 10 and 11 are the vertically arranged rods 21 and 22 which are clamped in place with the set screws 23 and 24. Adjustably supported on the vertically arranged rods 21 and 22 is a horizontal rod 25 by means of the clamping blocks and set screws 26 and 27 and slidably mounted on the rod 25 are the blocks 28. 29 is an L shaped threaded set screw for attaching the end ring of the tape measure 33. 34 is the riser pipe and 35 is the return pipe of the heater 9. Located on each of these pipes are adjustable clamps 36 and 37 which are similar to the construction shown at 28 and 31. 38 and 39 indicate the two center lines of pipe shown in Fig. 1 which are to be connected with the pipes 40 and 41 by means of the corner construction shown in Fig. 9. In practice the clamping construction shown in Fig. 5 by the numerals 10 and 11 is attached to the floor joists 18 and 19 as shown in Fig. 1 in dotted lines and the angular or corner shaped member 42 is attached to the depending rod 21. Secured to the angular shaped member 42 by means of the set screw 43 is a rod 43' having the adjustable tape attaching blocks 44 and 45 with the angular shaped set screws 46 and 47 for clamping them in place. Secured to the angular shaped member 42, is a rod 48, by means of the set screw 49. Located on the rod 48 are two slidable clamps 50 and 51. (See Fig. 1.) Attached to the joists or stringers 19 and 52 at their opposite ends are the joist attaching members 10 and 11. The rod member 25 is attached to these members by means of the depending rods 21 and 22 as before. The slidable blocks 28 and 31 on the rod 25, and, 44 and 45 on the rod 43' with their L shaped clamping set screws 28 and 31 on the rod 25 and 46 and 47 on the rod 43' serve for attaching and locating the tape lines which will exactly correspond with the position of the center lines of the pipes 38 and 39 when installed. The tape lines which are attached to and connect the adjustable blocks 36 and 50, and 37 and 51 correspond to the centers of the pipe lines 40 and 41 of the flow and return pipes 34 and 35 of the boiler 9. The dimensional lines 53 and 54 will therefore be the distances of the pipes leading from the riser 34 and return 35 to the pipes 38 and 39. The dimensional line 55 will be the distance from the flow pipe 39 to the center of the opening 56 in the floor. (See Fig. 1.) This opening is shown in Fig. 3 at the number 56. In order to accurately determine this vertical center line the construction shown in Figs. 3 and 4 is employed which comprises the slidable spider and cone shaped elements 58 and 59. These elements are shaped, as shown, and fit into the floor pipe opening 56. 60 and 61 are slidable blocks for retaining the spider shaped elements in the opening 56 and on the depending rod 62 which extends below the floor into the basement. Attached to the rod 62 are the horizontally arranged or extension rods 63 and 64 by means of the connecting block 65 and the set screw 66. The short dimensional line 67 will therefore represent the distance of the short pipe from the opening 56 to the flow pipe 38 of radiator 2 in Fig. 1. 68 represents the opening through which the flow pipe to the radiator 2 passes. Secured in the openings 68 is the structure just referred to in connection with Figs. 3 and 4. The dimensional line 69 is therefore the distance from the vertical pipe in the opening 68 to the center of the flow pipe 38. The same operation is carried out in measuring the pipe connections for radiator 7 by employing the construction shown in Figs. 3, 4, and 14 and the dimensional lines 70 and 71 will therefore represent the distance from the flow pipe 38 to the opening 72 of this radiator. Dimensional line 73, represents the length of pipe from the flow pipe 40 to inlet riser pipe in opening 68. Dimensional line 74 is the distance of return pipe 39 from radiator 7 to vertical opening 56. 75 designates the dimensional line from the return pipe 41 to the inlet of the boiler 9. This distance is then measured by placing a tape line on the hook members 76 and 77. 78 is the dimension of the riser pipe 80 which is obtained by attaching a tape line to the slidable blocks 36 and 79 on the pipe 80.

For the purpose of accurately making these measurements clamps 81 shown in Fig. 10 are employed. These are formed with a groove 82. These clamps are slipped over the different rods for clamping a tape measure to the rods. The end eye of a tape measure is slipped over the L shaped set screws as 46 and 47, as shown in Fig. 1, while its other end is clamped to a rod or bar by the clamp 81. The clamp 83 shown in Fig. 13 is for clamping together two tapes where they cross as at 84 in Fig. 3. The dimensional line 85 represents the distance from the outlet of radiator 7 to the return pipe 41. Referring to Fig. 12, 86 designates an angular shaped clamp which is threaded for attachment to a joist 87 for supporting a bracket 88 and verticle rod 89. 90 is a set screw for securing the rod 89 to the bracket 88. The rod 89 is understood to be used the same as the other rods on which the slidable blocks as 44 and 45 are placed with the hooks 46 and 47 to which the tape lines are connected, for making measurements of the different lengths of pipes.

Referring to Fig. 11 the rod 80 may be understood as projecting from the floor below as in Fig. 3. 91 is understood to represent a pipe reducing connection for the pipe 91'. The block 44 is then raised or lowered on the rod 80 to the correct position. A tape is attached to the hook 46 and measurements made as before.

The device is used as follows: The person who is to make the measurements first takes the floor plan of the building to be piped and numbers all of the different pipe lines thereon by suitable designating characters as for example No. 1, L. M., left main; No. 1, L. R., left return; No. 2, L. R.; No. 3, L. R.; No. 4, L. R., etc.; No. 2, L. M.; No. 3, L. M.; No. 4, L. M. etc; meaning respectively the different lengths of pipes for the left risers and left mains. The person who makes the measurements therefore places the dimensions on these differently numbered sections of lengths of pipes. The same numbering is carried out on the right hand side of the heater 9 as for example shown in Fig. 16, namely No. 2, R. R.; No. 3, R. R.; No. 4, R. R.; No. 5, R. R.; etc., and No. 2, R. M.; No. 3, R. M.; No. 4, R. M.; and No. 5, R. M., etc. These numbers are understood to represent the respective names of lengths of pipes for the different connections on a plan of the building. The measurements when made are placed on these designated or numbered pipe sections see Fig. 16. The horizontal pipe lengths for main and return of each of the radiators as 2 and 7 are shown in Figs. 16 and 16ᴬ. The radiators are understood to be suitably numbered as 2, 3, 4, etc. Then, when the measurements are made as described they are indicated on the plans of each piece or length of pipe for each radiator connection. The method and apparatus herein described therefore permits very accurate measurements to be made of all of the pipe connections at one operation. Then all of the different pieces to be cut and threaded at one operation; then all of the piping may be installed.

It is to be understood that the rods 21, 22, 25, 43, 61, 62, 63, and 64 are preferably square or rectangular in cross section, and that the slidable blocks 28, 31, 44, 45, 60 are formed with corresponding shaped openings slightly larger for slidable movement on these rods to prevent rotation of the blocks.

The openings between the plates of the spider shaped elements 58 serve the purpose of passing the tape measure through the floor and accurately measuring the distance from the pipe lines 38 and 39 to the point of connection with the radiators or in other words the length of the risers.

What I claim is:

1. A device for the purpose described comprising a plurality of members which are adjustable relative to each other, means for adjustably securing the same together, the ends of the members each having sharpened points for engaging the floor joists of of a building for retaining the adjustable members in place, depending rods on the said members, a transversely disposed rod on the depending rods, slidable blocks on the said transversely disposed rod, set screws for securing the blocks to said transversely disposed rod, the set screws being formed for attaching the ring ends of a tape line thereto, whereby when a plurality of said structures are attached, as described, the center lines of piping installation may be located and their lengths determined.

2. In a device for determining the lengths of different pieces of pipes for pipe fittings which consists in means for attachment to the floor joist members of a building, slidable blocks on the means which are attached to the joist members and designed to be located in positions which correspond with the pipe centers, and means for securing the slidable blocks to the said attachable means, said blocks being formed with hook shaped portions for attaching tape lines thereto, whereby the tape lines may be located in the center lines of the pipe fittings, as described, and the lengths of pieces of pipes determined.

3. Means for determining the lengths of pipe fittings which comprises in combination, devices for attachment to the floor part of a building, depending rods secured to the devices, a rod adjustably supported by the said rods, slidable devices on the last mentioned rod, an angular shaped member secured to one of the depending rods, rods attached to the arms of the said angular member, slidable blocks on the rods which are attached to the angular member, hook means on the blocks for attaching tape lines thereto, whereby said lines may be located in the center lines of the pipe fittings and their lengths determined.

4. A device for locating the center line of a pipe which comprises members for attachment to a part of the building, one of the members having an opening and the other slots, a bolt in the opening and one of the slots, depending rods attached to the members, a horizontal rod attached to the depending rods, slidable blocks on the horizontally disposed rod, and hooks on the blocks.

GEORGE W. HALL.